US012600051B2

(12) United States Patent
Park et al.

(10) Patent No.: US 12,600,051 B2
(45) Date of Patent: Apr. 14, 2026

(54) RAZOR ASSEMBLY

(71) Applicant: DORCO CO., LTD., Seoul (KR)

(72) Inventors: Sung Jin Park, Seoul (KR); Ji Hun Ki, Seoul (KR); Kyong Sik Lee, Seoul (KR)

(73) Assignee: Dorco Co., Ltd., Seoul (KR)

(*) Notice: Subject to any disclaimer, the term of this patent is extended or adjusted under 35 U.S.C. 154(b) by 320 days.

(21) Appl. No.: 18/356,575

(22) Filed: Jul. 21, 2023

(65) Prior Publication Data

US 2024/0025067 A1 Jan. 25, 2024

(30) Foreign Application Priority Data

Jul. 25, 2022 (KR) ........................ 10-2022-0091934
May 18, 2023 (KR) ........................ 10-2023-0064471

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01)

(58) Field of Classification Search
None
See application file for complete search history.

(56) References Cited

U.S. PATENT DOCUMENTS 4,492,024 A * 1/1985 Jacobson .............. B26B 21/227 30/50
5,636,442 A 6/1997 Wain
11,298,842 B2 * 4/2022 Hurtado ................ B26B 21/225
2021/0178618 A1 6/2021 Han et al.
2023/0166419 A1 * 6/2023 Song ....................... B26B 21/22 30/67
2024/0025067 A1 * 1/2024 Park ...................... B26B 21/521

FOREIGN PATENT DOCUMENTS

KR 10-2012-0083301 A 7/2012
KR 101730415 B1 * 4/2017 ........... B26B 21/521

OTHER PUBLICATIONS

English translation of KR-101730415-B1, dated Apr. 26, 2017.*
European Search Report dated Oct. 30, 2023 in European Application No. 23187149.2.
Office Action received in corresponding Korean Patent Application No. 10-2023-0064471 dated Jul. 1, 2025.

* cited by examiner

*Primary Examiner* — Hwei-Siu C Payer
(74) *Attorney, Agent, or Firm* — Knobbe, Martens, Olson & Bear, LLP

(57) ABSTRACT

A razor assembly is proposed. The razor assembly may include a razor cartridge including at least one razor blade, and a razor handle pivotably coupled to the razor cartridge. The razor cartridge may include a blade housing accommodating the razor blade so that at least a portion of a cutting edge of the at least one razor blade is exposed toward a front side and a handle coupling part provided on one side of the blade housing and pivotably coupled to the razor handle. The handle coupling part may include a separation preventing protrusion protruding to prevent the razor handle from being separated from the handle coupling part. The razor handle may include a connecting arm that moves along one surface of the handle coupling part.

16 Claims, 20 Drawing Sheets

RAZOR ASSEMBLY

CROSS-REFERENCE TO RELATED APPLICATIONS

This application claims the benefit of Korean Patent Application Nos. 10-2022-0091934, filed on Jul. 25, 2022, and 10-2023-0064471, filed on May 18, 2023, the contents of both of which are hereby incorporated by reference herein in their entirety.

BACKGROUND

Technical Field

The present disclosure relates to a razor assembly.

Description of Related Technology

In general, a razor is a product for cutting facial or body hair such as beard and mustache. The razor is composed of a razor handle for gripping and a razor cartridge provided with a razor blade for shaving in contact the skin.

SUMMARY

One aspect is a razor assembly that can prevent separation of a razor handle and a razor cartridge in a situation not intended by a user.

Another aspect is a razor assembly that can guide correct assembly of a razor by allowing a cartridge to be properly attached to a razor handle in a correct direction while preventing the cartridge from being attached to the razor handle in the opposite direction.

Another aspect is a razor assembly including: a razor cartridge including at least one razor blade; and a razor handle pivotably coupled to the razor cartridge.

The razor cartridge may include: a blade housing accommodating the razor blade so that at least a portion of a cutting edge of the at least one razor blade is exposed toward a front side; and a handle coupling part provided on one side of the blade housing and pivotably coupled to the razor handle.

The handle coupling part may comprise a separation preventing protrusion protruding to prevent the razor handle from being separated from the handle coupling part.

The razor handle may include a connecting arm that moves along one surface of the handle coupling part.

The connecting arm positions the separation preventing protrusion inside of an inner wall of the connecting arm while the connecting arm is moved along the one surface of the handle coupling part.

The connecting arm may include an accommodating groove recessed from the inner wall to receive the separation preventing protrusion when the connecting arm is coupled to the handle coupling part.

The handle coupling part may further include an arc-shaped support for guiding a pivoting motion of the razor handle, and the connecting arm may slide along one surface of the arc-shaped support.

The separation preventing protrusion may protrude from the arc-shaped support, and an inner wall of the connecting arm may accommodate the separation preventing protrusion while the connecting arm slides along the one surface of the arc-shaped support part.

The separation preventing protrusion may be spaced apart from a most protruding point of the arc-shaped support.

The razor handle may be pivotably coupled to the razor cartridge between a neutral position and a pivot limit position, and when the razor handle is in the neutral position, at least a portion of the separation preventing protrusion may be positioned not to be aligned with the accommodating groove.

The razor handle may be pivotably coupled to the razor cartridge between a neutral position and a pivot limit position, and when the razor handle is in the pivot limit position or between the neutral position and the pivot limit position, the separation preventing protrusion and the accommodating groove may be aligned with each other.

The handle coupling part may further include a lateral support part that is spaced apart from the separation preventing protrusion and protrudes toward one side of the blade housing, and the connecting arm may be positioned between the lateral support part and the separation preventing protrusion.

The connecting arm may be moved along the one surface of the handle coupling part in a state where one side of the connecting arm is supported by the separation preventing protrusion and the other side of the connecting arm is supported by the lateral support part.

The lateral support part may further include a hook support part that supports the connecting arm toward a front side of the razor cartridge so that the connecting arm is prevented from being separated rearward of the razor cartridge.

The separation preventing protrusion may be disposed eccentrically from a central portion of the razor cartridge and the accommodating groove is disposed eccentrically from a central portion of the connecting arm so as to prevent the razor cartridge from being reversely coupled to the razor handle. The second accommodating groove may be formed at a periphery of the inner wall of the inner wall of the connecting arm.

The separation preventing protrusion may have an asymmetrical shape with respect to a direction in which the razor handle is coupled to the razor cartridge, so that the razor cartridge is prevented from being coupled to the razor handle in a reverse direction.

The separation preventing protrusion may include: a first inclined surface protruding from one surface of the handle coupling part and having a predetermined angle relative to the one surface of the handle coupling part; and a second inclined surface protruding from the other surface of the handle coupling part and inclined in a direction toward the first inclined surface.

A width between the first inclined surface and the second inclined surface may decrease as it goes in a protruding direction of the separation preventing protrusion.

A length of the second inclined surface may be longer than a length of the first inclined surface.

The accommodating groove may be recessed from the inner wall of the connecting arm, so that a space accommodating the separation preventing protrusion has a shape corresponding to a shape of the separation preventing protrusion.

The razor handle may further include: a return force providing unit comprising an elastic material to elastically support the blade housing in a state in which the razor handle is coupled to the handle coupling part.

Other specific details of the invention are included in the detailed description and drawings.

According to embodiments of the present disclosure, at least the following effects are obtained.

Except in situations where a user intends to separate the razor handle and razor cartridge, it is possible to prevent an unintended separation of the razor handle and the razor cartridge.

In addition, it is possible to guide correct coupling of the razor handle and the razor cartridge, thereby preventing inconvenience due to incorrect coupling.

Effects according to the present disclosure are not limited by the contents exemplified above, and more various effects are included in the present specification.

DETAILED DESCRIPTION

Figure 1:
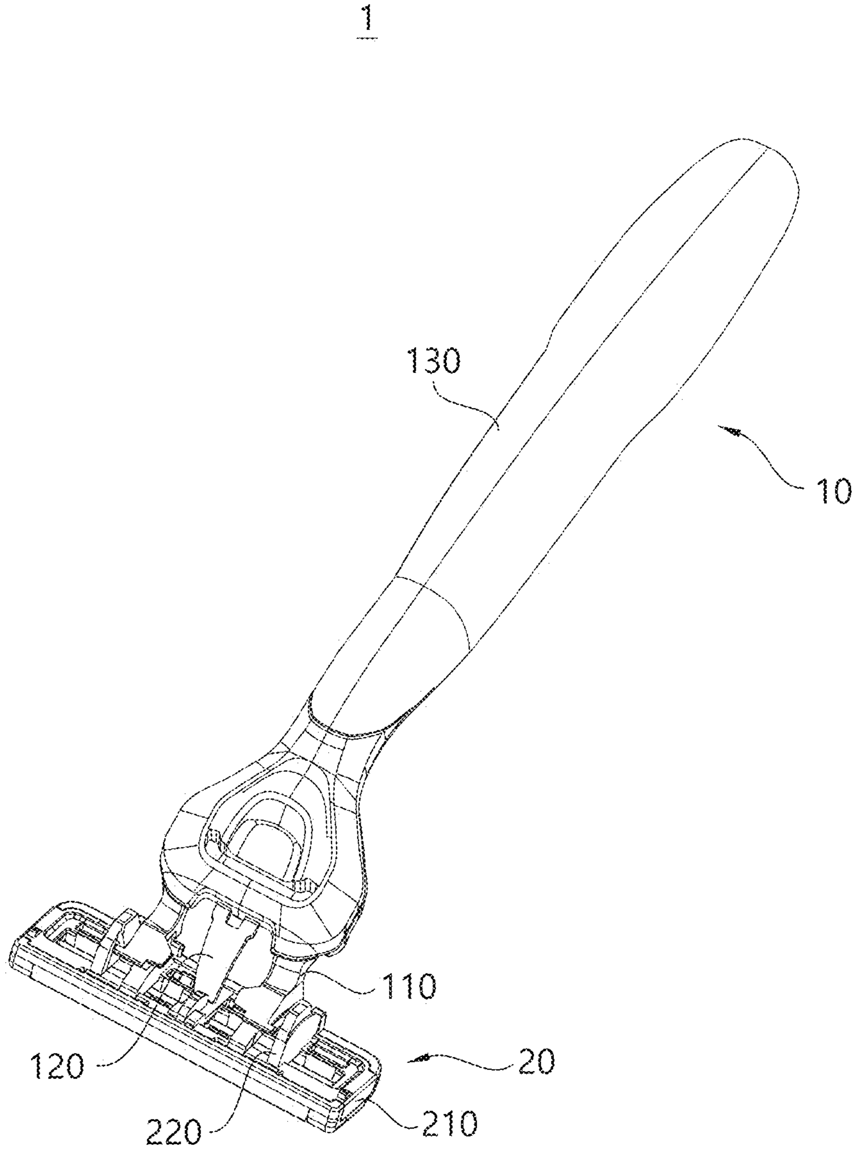
FIG. 1 is a perspective view of a razor assembly according to one embodiment of the present disclosure.

In order to ensure a close contact between the cartridge and the user's skin surface which has various contours, the razor cartridge is pivotably coupled to the razor handle.

Meanwhile, the razor handle and the razor cartridge are configured in a modular in design, so that the user can replace either as needed. However, due to the separable structural characteristics of the razor handle and the razor cartridge, the razor handle and the razor cartridge may be unintentionally separated during use.

When an external force is applied to the razor while the user is using the razor (for example, when the user accidentally drops the razor, causing an impact, or if the razor accidentally is hit by an external object in an attempt to remove debris or foreign substances stuck to the razor blade during shaving), the unintentional separation may occur.

If the razor handle and the razor cartridge are unintentionally separated, the user should stop shaving and reattach the razor handle and the razor cartridge again in order to continue shaving. Also, in such separation situation, the user may sometimes mistakenly perceive the razor as damaged and end up discarding the razor handle or cartridge that can still function properly. In addition, an attempt to insert the cartridge forcibly into the handle may result in an injury caused by the razor blade of the cartridge.

Meanwhile, in general, a guard is located at a lower end of the front side of the razor cartridge, the razor blade is located in the middle, and a lubricating band is located at an upper end. Here, the guard contacts the user's skin prior to the razor blade, helping to pull the user's skin through a material such as rubber or open structure or pre-applying shaving aids to assist in shaving before the razor blade comes into contact with the skin. In addition, the lubricating band comprises a lubricating composition to reduce skin irritation and help smooth shaving. The lubricating band serves to apply the lubricating composition to the shaved skin following the razor blade. A cutting edge of the razor blade is generally directional and extends in a specific direction. Accordingly, the cutting edge performs shaving only when stroked in a specific direction (a correct shaving direction when properly installed). When the cutting edge is stroked in the opposite direction, shaving is not performed. That is, in general, the razor cartridge has a directional shape.

However, in the process of coupling the razor handle and the razor cartridge, the razor cartridge may be coupled in the opposite direction. In this case, the direction of the razor blade is reversed, so shaving becomes difficult, and the guard and/or lubrication band have difficulty performing their roles efficiently.

Advantages and features of the present disclosure and a method of achieving the same should become clear with embodiments described in detail below with reference to the accompanying drawings. However, the present disclosure is not limited to the embodiments disclosed below and may be realized in various other forms. The present embodiments make the disclosure complete and are provided to completely inform one of ordinary skill in the art to which the present disclosure pertains of the scope of the disclosure. The present disclosure is defined only by the scope of the claims.

In addition, embodiments herein will be described with reference to cross-sectional views and/or schematic views, which are ideal exemplary views of the present disclosure. Therefore, the form of an exemplary view may be deformed due to a manufacturing technique and/or an allowable error. In addition, in each drawing of the present disclosure, each element may have been somewhat enlarged or reduced in consideration of convenience of description. Like reference numerals refer to like elements throughout the specification.

Hereinafter, for convenience of description, the portion of a razor cartridge that comes into contact with the skin will be described as a front side, and the side to which a razor handle is coupled will be described as a back side. However, this is for convenience of description, and it may be understood that a forward/backward direction is an up/down direction or a left/right direction depending on a point of view.

A cutting edge mentioned in the following description may refer to a blade portion that is positioned at a front end of a razor blade to cut hair.

Hereinafter, the present disclosure will be described with reference to drawings to explain a razor assembly according to an embodiment of the present disclosure. First, referring FIGS. 1 to 3, schematic components of a razor assembly 1 according to an embodiment of the present disclosure will be described.

Figure 2:
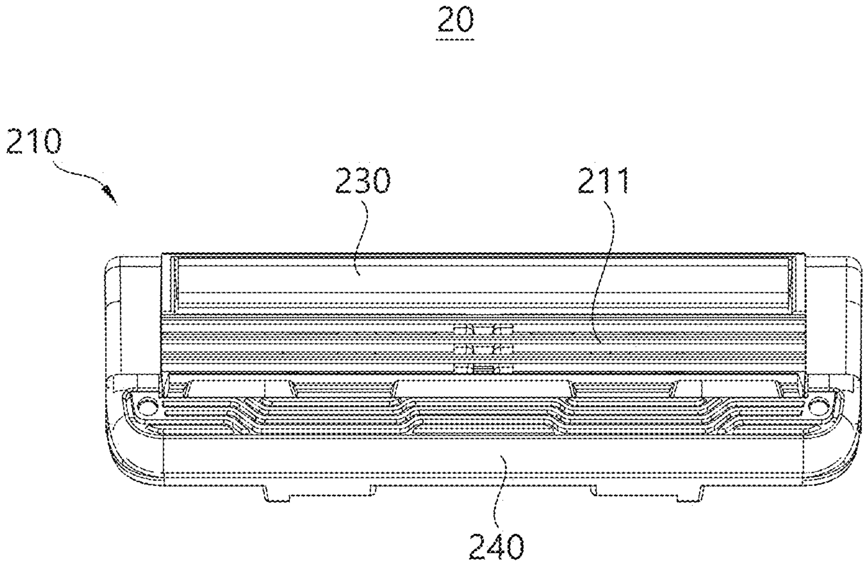
FIG. 2 is a front view of a razor cartridge according to an embodiment of the present disclosure.
Figure 3:
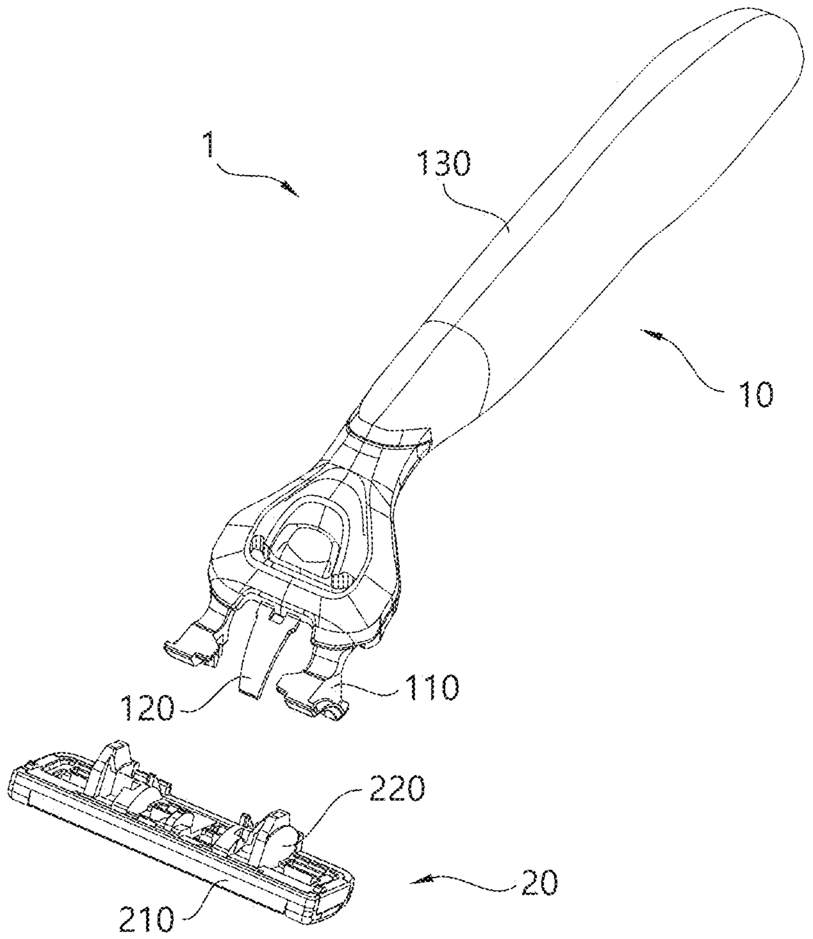
FIG. 3 is an exploded perspective view of the razor assembly shown in FIG. 1.

FIG. 1 is a perspective view of a razor assembly according to one embodiment of the present disclosure. FIG. 2 is a front view of a razor cartridge according to an embodiment of the present disclosure. FIG. 3 is an exploded perspective view of the razor assembly shown in FIG. 1.

As shown in FIGS. 1 to 3, the razor assembly 1 may include a razor handle 10 and a razor cartridge 20.

The razor handle 10 may correspond to a handle to be held by a user while using the razor. The razor handle 10 may have an elongated shape so that the user can comfortably grip. In addition, the razor handle 10 may be pivotably coupled to the razor cartridge 20 so that an angle thereof can be adjusted to adapt to a curvature of the skin during shaving.

The razor handle 10 may include subcomponents of a gripping handle 130, a return force providing part 120, and a connecting arm 110.

The gripping handle 130 may be a part that occupies a large portion of the razor handle 10 and includes a portion to be gripped by a user with a hand. In order for the user to grip the gripping handle 130 easily, grooves formed to correspond to the shape of fingers or pads made of materials such as rubber may be provided in the gripping handle 130 to increase friction with the user's skin.

The return force providing part 120 may extend from one end of the gripping handle 130 and may be formed of a material having elasticity. A free end of the return force providing part 120 may come into contact with a surface of the razor cartridge 20 while the razor handle 10 is coupled to the razor cartridge 20.

The return force providing part 120 may provide a return force for maintaining the razor cartridge 20 at a predetermined angle relative to the razor handle 10 when there is no external force. To this end, the return force providing part 120 may elastically support the razor cartridge 20 while the razor handle 10 is coupled with the razor cartridge 20. In doing so, even if an external force is applied to the razor cartridge 20 and the razor cartridge 20 pivots with respect to the razor handle 10, the razor cartridge 20 may be able to return to an initial state when the external force is removed.

The return force providing part 120 may be provided in an extended shape protruding from an end portion of the gripping handle 130. In addition, the return force providing part 120 may contact the razor cartridge 20 and extend along a curved path so that the return force providing part 120 bends upon an external force and straightens when the external force is removed. The return force providing part may be provided as a single return force providing part or may be provided as a plurality of return force providing part.

In addition, the return force providing part 120 is not limited to the embodiment shown in the drawings, and may have various modified embodiments capable of providing a return force by contacting the razor cartridge 20. For example, the return force providing part 120 may be implemented in a spring plunger method.

The connecting arm 110 may have a structure coupled to the razor cartridge 20. While coupled to the razor cartridge 20, the connecting arm 110 may be movable along one surface of a handle coupling part 220 which will be described later.

Meanwhile, the connecting arm 110 may be provided as a pair of connecting arms having a symmetric shape, and the connecting arms may be provided on both sides of the return force providing part 120, respectively. For example, the return force providing part 120 may be formed to extend from a central portion of one end of the grip handle 130, and the respective connecting arms 110 may be formed to extend from the left and right ends of the grip handle 130.

The pair of connecting arms 110 may include a material having elasticity so that a width of the connecting arms 110 can be adjusted during the separation or coupling of the razor handle 10. More specifically, a user may couple the razor handle 10 and the razor cartridge 20 by positioning the connecting arm 110 behind the handle coupling part 220 and then having the connecting arm 110 enter into a space in the handle coupling part 220.

The connecting arm 110 may be mounted in the inner space of the handle coupling part 220 by a force that the user applies in the direction of the handle coupling part 220. In this case, the connecting arm 110 may enter along an inclined surface of a hook support part **223*b* (see FIGS. 4 and 5) while entering into the hand coupling part 220**.

In the process of entering along the inclined surface of the hook support part **223*b*, the pair of connecting arms 110 may gradually come closer to each other and a width therebetween may be decrease. When the pair of connecting arms 110 completely enter into the handle coupling part 220, the support by the hook support part 223*b* may be released, the pair of connecting arms 110 may be spaced apart from each other again, and the connecting arms 110 and the handle coupler 220** may be coupled.

The razor cartridge 20 may be a cartridge that performs the cutting of hair, because the razor cartridge 20 includes at least one razor blade. The razor cartridge 20 may cut hair while moving on the skin in a direction in which the user operates the razor handle 10.

The razor cartridge 20 may include a lubricating band 230, a guard 240, a blade housing 210, and a handle coupling part 220.

Referring to FIG. 2, on a front side of the blade housing 210, a cutting edge positioned at a front end of a razor blade 211 may be exposed to the outside of the blade housing 210. Referring to FIG. 2, the razor blade 211 moves downward and cuts the hair located on a movement path.

The lubricating band 230 is disposed above the razor blade 211 on the front side of the blade housing 210, and may follow a point through which the razor blade 211 passes. The lubricating band 230 may be coated with a lubricating composition such as oil or medicine to reduce irritation of the skin, and accordingly, the lubricating band 230 may soothe the skin where the razor blade 211 passes.

The guard 240 is disposed lower than the razor blade 211 on the front side of the blade housing 210, and may pass through a point where the razor blade 211 passes during shaving. The guard 240 may contact the user's skin prior to the razor blade 211 to pull the user's skin through a rubber material or open structure and/or to apply shaving aids to assist in shaving before the razor blade 211 touches the skin.

The blade housing 210 accommodates a razor blade and may be a component forming the overall shape of the razor cartridge 20. The blade housing 210 may accommodate the razor blade 211 so that at least a portion of the cutting edge of the razor blade 211 for cutting hair is exposed to the front. In doing so, when the front side of the blade housing 210 is in close contact with the skin and moves along the skin, the cutting edge may cut hair from the skin.

The handle coupling part 220 may be provided on one side of the blade housing 210, more specifically, on the rear side of the blade housing 210, and may have a structure that is pivotably coupled to the razor handle 10. A detailed configuration of the handle coupler 220 will be described with reference to FIGS. 4 to 5.

Figure 4:
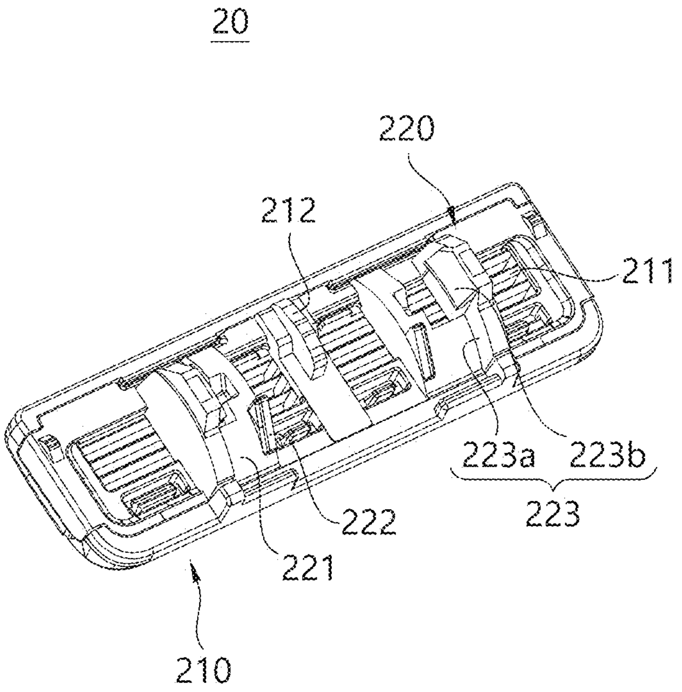
FIG. 4 is a perspective view of a razor cartridge according to an embodiment of the present disclosure.
Figure 5:
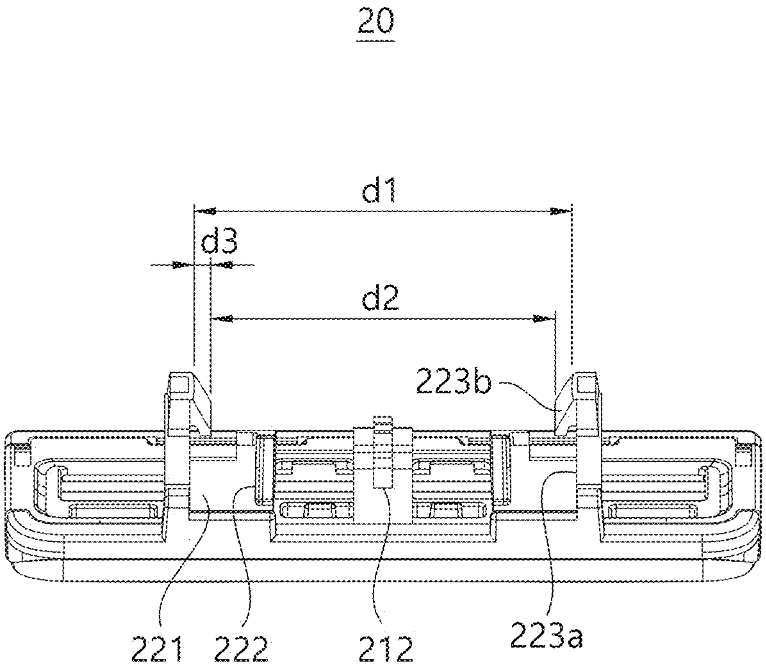
FIG. 5 is a bottom view of a razor cartridge according to an embodiment of the present disclosure.

FIG. 4 is a perspective view of the razor cartridge 20 according to an embodiment of the present disclosure. FIG. 5 is a bottom view of the razor cartridge 20 according to an embodiment of the present disclosure.

As shown in FIGS. 4 to 5, a protruding support part 212 and a handle coupling part 220 may be provided at the rear of the blade housing 210. Also, the cutting edge of the razor blade 211 may not be exposed to the rear side of the blade housing 210.

The protruding support part 212 may be a component that supports a free end of the return force providing part 120 in a state in which the razor cartridge 20 is coupled to the razor handle 10. The return force providing part 120 supported by the protruding support part 212 may be bent by an external force when the razor cartridge 20 pivots, and may be straighten again and push the protruding support part 212 when the external force is removed.

The protruding support part 212 may be formed to protrude near an upper central portion of the rear side of the blade housing 210. In addition, the protruding support part 212 may be positioned rearward than the razor blade 211.

A pair of handle coupling parts 220 may be symmetrically disposed on both sides of the protruding support part 212. Hereinafter, components of the handle coupling part 220 will be described, and a direction toward the protruding support part 212 will be referred to as an inner side, and a direction away from the protruding support part 212 will be referred to as an outer side.

The handle coupling part 220 may include an arc-shaped support part 221, a lateral support part 223, and a separation preventing protrusion 222.

The arc-shaped support 221 may be a component that guides a pivoting motion of the connecting arm 110 (see FIGS. 1 and 2). More specifically, the arc-shaped support 221 may form a path where an end of the connecting arm 110 contracts and moves when the connecting arm 110 pivots.

The arc-shaped support 221 may be provided as a convex arc-shaped member protruding toward the rear of the blade housing 210. A surface of the arc-shaped support 221 that directly contacts with the connecting arm 110 may have a curved surface corresponding to a curvature of an end portion of the connecting arm 110.

In order to support the pair of connecting arms 110, the arc-shaped supports 221 may also be provided as a pair of supports and may be symmetrically positioned with respect to the protruding support part 212.

The lateral support part 223 may be a component for supporting a lateral side of the connecting arm 110. The lateral support part 223 may be formed protruding toward the rear of the blade housing 210 and may be positioned outside the arc-shaped support part 221. In doing so, the lateral support part 223 may prevent the connecting arm 110 coupled to the razor cartridge 20 from being separated outward from the arc-shaped support part 221.

The side support part 223 may include a side wall **223*a* and a hook support part 223*b***.

The side wall **223*a* is a frame that protrudes from a side surface of the arc-shaped support part 221, and may prevent the connecting arm 110 from being separated outward from the arc-shaped support part 221. A distance d1 between a pair of side walls may correspond to a width w1 (see FIG. 7) of the connecting arm 110** when there is no external force.

The hook support part **223*b* may be a member that prevents the connecting arm 110 from being separated backward from the razor cartridge 20. To this end, the hook support part 223*b* may support the connecting arm 110 pivoting at the rear of the arc-shaped support part 221** toward the front side.

The hook support part **223*b* may be formed protruding inward from a free end of the side wall 223*a* and may have a surface facing the arc-shaped support part 221. The connecting arm 110 may perform an up/down pivoting movement between the hook support 223*b* and the arc-shaped support 221, being supported at the rear by the hook support 223*b* and at the front by the arc-shaped support 221**.

The separation preventing protrusion 222 may formed protruding from the blade housing 210 to prevent the connecting arm 110 from being separated from the handle coupling part 220. The separation preventing protrusion 222 may prevent the connecting arm 110 on the arc-shaped support part 221 from being separated in an inward direction of the arc-shaped support part 221.

The separation preventing protrusion 222 may be located on the inside of the arc-shaped support 221 and may be provided as a pair of supports to correspond to the pair of connecting arms 110. However, the separation preventing protrusion 222 may not necessarily be provided as the pair of supports, and may be provided only on an inner side of any one arc-shaped support part 221. Hereinafter, for convenience of description, it will be described that the separation preventing protrusion 222 is provided as a pair of separation preventing protrusions, but the present disclosure is not limited thereto.

Referring to FIG. 4, the separation preventing protrusion 222 may be located at a position eccentrically away from the center of the blade housing 210. For example, the separation preventing protrusion 222 may be formed protruding in the downward direction from the maximum protruding point of the arc-shaped support 221. In addition, the separation preventing protrusion 222 may be provided in an asymmetrical shape. For example, the separation preventing protrusion 222 may have a substantially triangular shape. This will be described later with reference to FIGS. 19 to 20.

Hereinafter, the razor handle 10 will be described in detail with reference to FIGS. 6 and 7.

Figure 6:
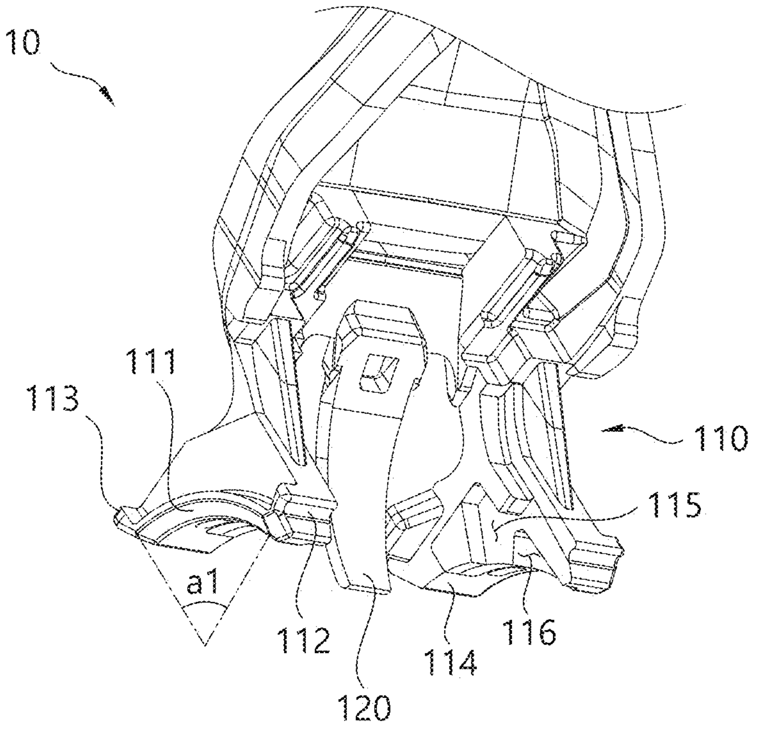
FIG. 6 is a detailed view of an end portion of a razor handle according to an embodiment of the present disclosure.

FIG. 6 is a detailed view of an end portion of a razor handle 10 according to an embodiment of the present disclosure. FIG. 7 is a detailed view of an end portion of the razor handle 10 according to an embodiment of the present disclosure, as viewed from a different angle than that of FIG. 6.

Figure 7:
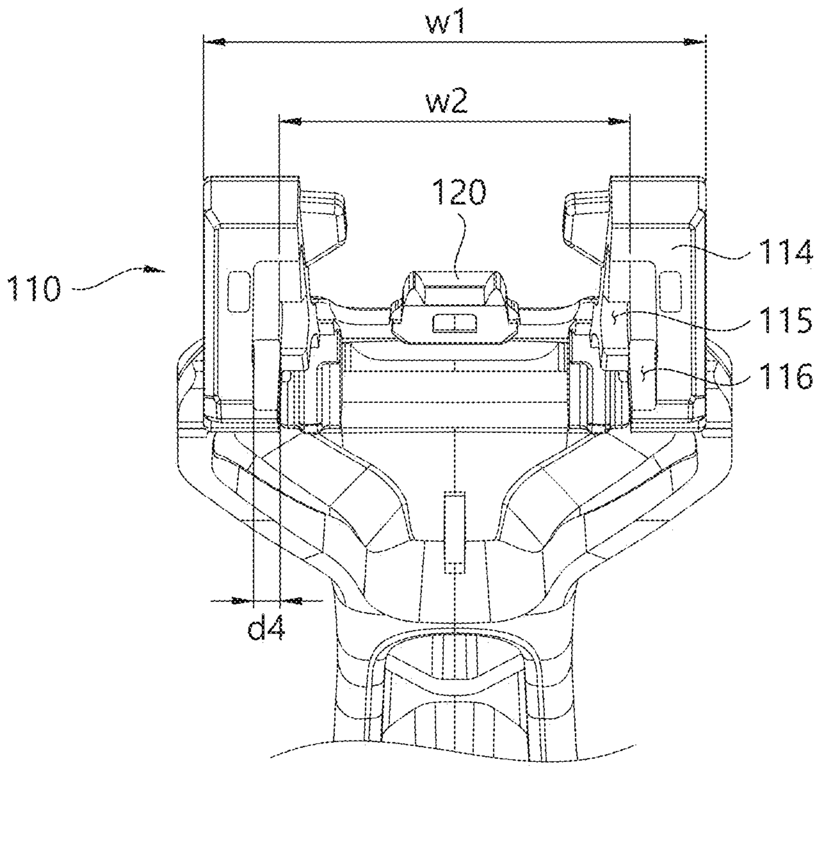
FIG. 7 is a detailed view of an end portion of a razor handle according to an embodiment of the present disclosure, as viewed from a different angle than that of FIG. 6.

As shown in FIGS. 6 and 7, a separation preventing flange 111 formed to protrude outward from a front end of the connecting arm 110 may be positioned at a front end of the connecting arm 110.

While the razor handle 10 (see FIG. 2) and the razor cartridge 20 (see FIG. 2) are coupled, the separation preventing flange 111 may be positioned in a space between the arc-shaped support part 221 (see FIG. 4) and the hook support part 223*b* (see FIG. 4). Accordingly, in a state in which the razor handle 10 and the razor cartridge 20 are coupled, forward and backward movement of the separation preventing flange 111 may be restricted by the arc-shaped support part 221 and the hook support part 223*b*.

In a state in which the razor handle 10 and the razor cartridge 20 are coupled, the separation preventing flange 111 may be positioned between the separation preventing protrusion 222 (see FIG. 4) and the side wall 223*a* (see FIG. 4). Accordingly, in a state in which the razor handle 10 and the razor cartridge 20 are coupled, leftward and rightward movement of the separation preventing flange 111 may be restricted by the separation preventing protrusion 222 and the sidewall 223*a*.

As described above, when there is no external force, the width w1 of the pair of connecting arms 110 corresponds to the distance d1 between the pair of sidewalls 223*a* (see FIG. 5), and thus the pair of connecting arms 110 may be accommodated between the side walls 223*a*. For example, when there is no external force, the width w1 of the pair of connecting arms 110 may be the same as or slightly smaller than the distance d1 between the pair of sidewalls 223*a*.

In addition, since at least a portion of the separation preventing flange 111 is supported by the hook support part 223*b*, the width w1 between the pair of connecting arms 110 may be greater than a distance d2 between a pair of hook support parts 223*b*.

In order to prevent the hook support parts 223*b* from contacting inner walls of the connecting arms 110 and interfering with a pivoting motion, the width of the separation preventing flange 111 may be greater than a protruding width d3 of the hook support parts 223*b*.

In this case, since both sides of one connecting arm 110 are supported by the lateral support part 223 and the separation preventing protrusion 222, a width of one connecting arm 110 may correspond to a distance between the lateral support part 223 and the separation preventing protrusion 222.

An arc-shaped contact surface 114 having a curvature so as to be seated on the arc-shaped support 221 may be formed in a front surface of the separation preventing flange 111. The arc-shaped contact surface 114 may be formed with a concave curved surface to correspond to the shape of the convex arc-shaped support part 221. A central angle a1 of the arc-shaped contact surface 114 may be formed in consideration of a pivotable range of the connecting arm 110.

A first stopper 112 and a second stopper 113 may be formed at both ends of the separation preventing flange 111. The first stopper 112 may protrude and be formed at one end of the separation preventing flange 111, and the second stopper 113 may protrude and be formed at the other end of the separation preventing flange 111. Since the first stopper 112 and the second stopper 113 protrude from the both ends of the arc-shaped contact surface 114, the connecting arm 110 may be able to pivot by the central angle a1 of the arc-shaped contact surface 114.

A first accommodating groove 115 formed as a result of inward recession of the surface of the connecting arm 110, and a second accommodating groove 116 additionally recessed from the first accommodating groove 115 may be formed in an inner wall of the front end of the connecting arm 110. Like the connecting arm 110, the first accommodating groove 115 and the second accommodating groove 116 may be provided as a pair and may be formed at positions symmetrical to those of the connecting arms 110.

The first accommodating groove 115 may accommodate the separation preventing protrusion 222 when the connecting arm 110 pivots along the arc-shaped support 221 within a range of the central angle a1. A width w2 between the pair of first accommodating grooves 115 may be equal or similar to a distance between the pair of separation preventing protrusions 222 so that an inner wall of the first accommodating groove 115 and the separation preventing protrusion 222 does not interfere with the pivoting motion of the connecting arm 110.

The second accommodating groove 116 may be a groove in which the separation preventing protrusion 222 is accommodated when the connecting arm 110 is coupled to or separated from the handle coupling part 220. The second accommodating groove 116 may be formed by being recessed near the periphery of the first accommodating groove 115. In addition, in order to accommodate the separation preventing protrusion 222, an inner space of the second accommodating groove 116 may have a shape identical or similar to a shape of the separation preventing protrusion 222. In addition, in consideration of the position of the separation preventing protrusion 222 disposed eccentrically in the arc-shaped support part 221, the second accommodating groove 116 may be formed at a position eccentrically away from a central axis of the connecting arm 110.

In order to accommodate the separation preventing protrusion 222, a depth d4 of the second accommodating groove 116 may correspond to a width of the separation preventing protrusion 222.

As described above, a user may have the pair of connecting arms 110 enter into a position between the hook support parts 223*b* to couple the connecting arms 110 and the handle coupling part 220.

Alternatively, the user may pivot the connecting arm 110 so that the second accommodating groove 116 is positioned next to the separation preventing protrusion 222, and then the user may apply an eternal force to bring the connecting arms 110 closer to each other so that the separation preventing protrusion 222 can be accommodated in the second accommodating groove 116. Then, the user may separate the razor handle 10 and the razor cartridge 20 by separating the connecting arm 110 from the handle coupling part 220.

In this case, if the separation preventing flange 111 interferes with the hook support part 223*b* while the separation preventing protrusion 222 is accommodated in the second accommodating groove 116, it may be difficult to separate or couple the connecting arm 110. Accordingly, the depth d4 of the second accommodating groove 116 may be equal to or greater than the protruding width d3 of the hook support part 223*b*. In doing so, when the connecting arm 110 moves inward by the depth d4 of the second accommodating groove 116, the separation preventing flange 111 may come outside of the hook support part 223*b*.

Hereinafter, a neutral position of the razor handle 10 will be described with reference to FIGS. 8 to 10.

Figure 8:
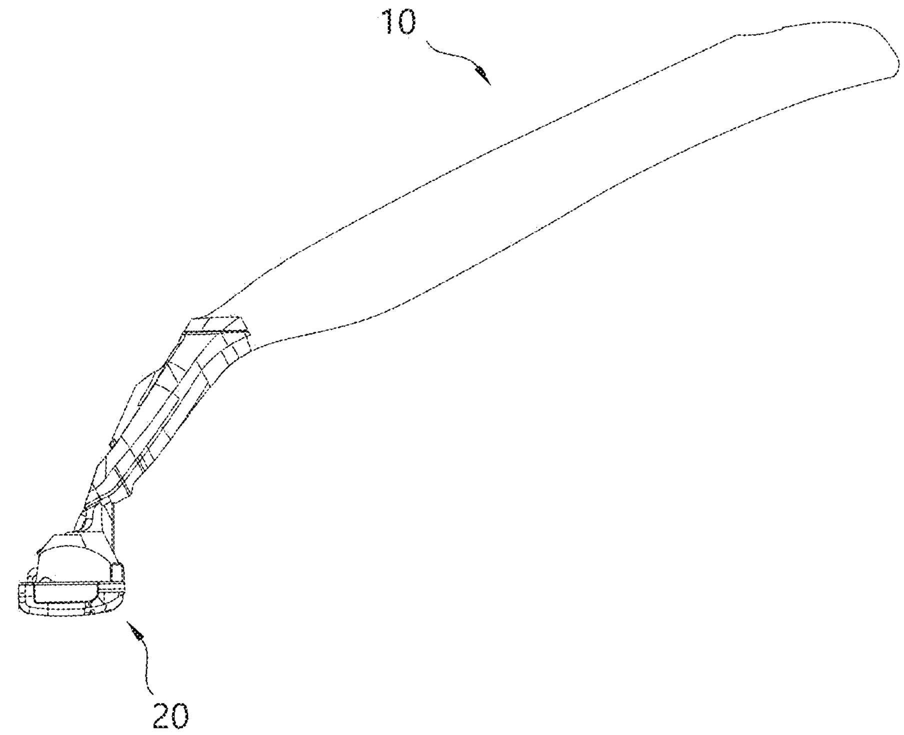
FIG. 8 is a view showing a state in which a razor handle according to an embodiment of the present disclosure is at a neutral position with respect to a razor cartridge.

FIG. 8 is a view showing a state in which the razor handle 10 according to an embodiment of the present disclosure is in a neutral position with respect to the razor cartridge 20. FIG. 9 is a view showing a coupled state of the razor handle 10 and the razor cartridge 20 in the neutral position. In addition, FIG. 10 is a view showing a coupled state of the razor handle 10 and the razor cartridge 20 in the neutral position, as viewed from an angle different from that of FIG. 9.

The neutral position shown in FIG. 8 may be a position of the razor handle 10 relative to the razor cartridge 20 when there is no external force. In this state, the razor cartridge 20 may receive a counterclockwise force based on FIG. 8 due to an elastic force of the return force providing part 120. Thus, in the neutral position, an angle between the razor cartridge 20 and the razor handle 10 may be minimized.

Figure 9:
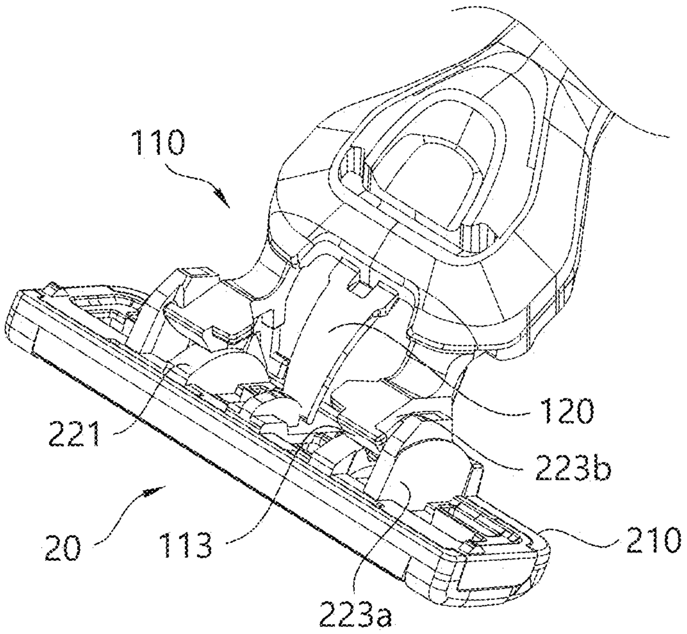
FIG. 9 is a view showing a coupled state of a razor handle and a razor cartridge in a neutral position.

Referring to FIG. 9, in the neutral position, the second stopper 113 may come into contact with the hook support part **223*b* by the elastic force of the return force providing part 120. Further pivoting of the second stopper 113 may be prevented due to interference by the hook support part 223*b***.

Figure 10:
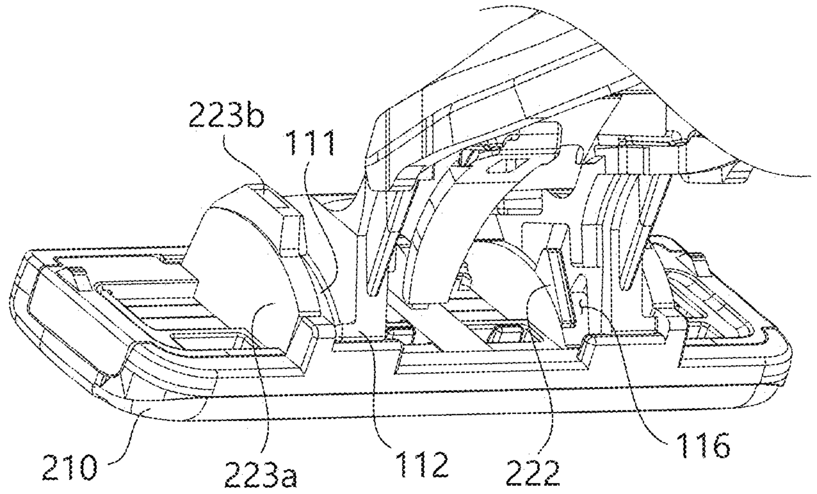
FIG. 10 is a view showing a coupled state of a razor handle and a razor cartridge in a neutral position at an angle different from that of FIG. 9.

Also, referring to FIG. 10, the first stopper 112 may come into contact with the blade housing 210 by the elastic force of the return force providing part 120. Likewise, further pivoting of the first stopper 112 may be prevented due to interference with the blade housing 210.

Meanwhile, in a state where the razor handle 10 is in the neutral position, the second accommodating groove 116 and the separation preventing protrusion 222 may not be arranged in a straight line. Accordingly, in a case where in a state where the razor handle 10 is in the neutral position, even if there is an external force, the separation preventing protrusion 222 may not be accommodated in the second accommodating groove 116 but may be supported on the inner wall of the first accommodating groove 115.

Therefore, in the razor assembly 1 according to an embodiment of the present disclosure, it is possible to prevent the separation preventing protrusion 222 from being accommodated in the second accommodating groove 116 in the neutral position. In a state where the separation preventing protrusion 222 is not accommodated in the second accommodating groove 116, the separation preventing flange 111 may be positioned between the hook support **223*b*, the arc-shaped support 221, the lateral support part 223, and the separation preventing protrusion 222, thereby preventing separation of the razor assembly 1**.

Hereinafter, a pivot limit position will be described with reference to FIGS. 11 to 13.

Figure 11:
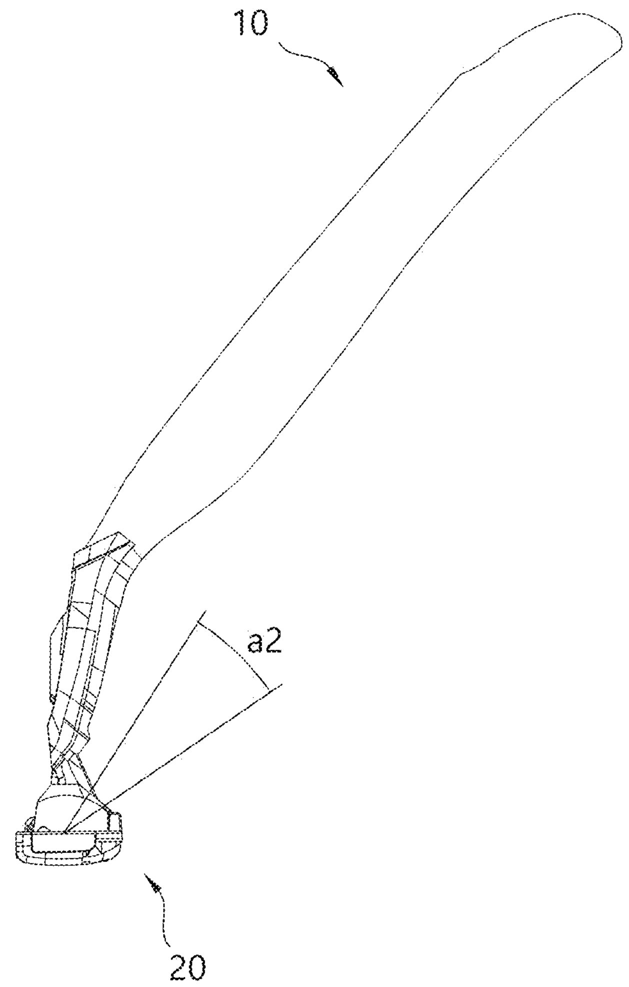
FIG. 11 is a view showing a state in which a razor handle according to an embodiment of the present disclosure is at a pivot limit position with respect to a razor cartridge.
Figure 12:
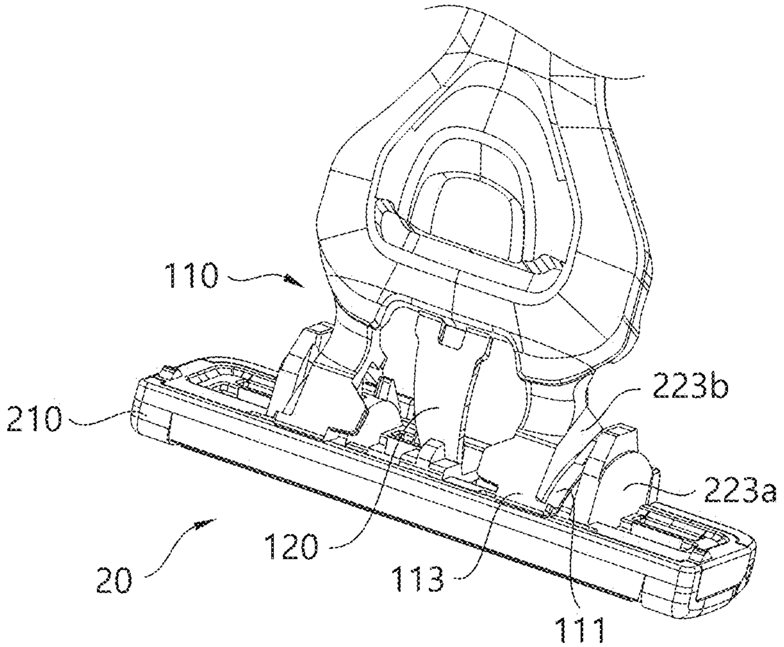
FIG. 12 is a view showing a coupled state of a razor handle and a razor cartridge at a pivot limit position.

FIG. 11 is a view showing a state in which the razor handle 10 according to an embodiment of the present disclosure is in the pivot limit position with respect to the razor cartridge 20. FIG. 12 is a view showing a coupled state of the razor handle 10 and the razor cartridge 20 in the pivot limit position. Also, FIG. 13 is a view showing a coupled state of the razor handle 10 and the razor cartridge 20 in the pivot limit position, as viewed from an angle different from that of FIG. 12.

The pivot limit position shown in FIG. 11 may be a position in a state where the razor handle 10 is maximally pivoted from the neutral position. In FIG. 11, a pivot angle a2 may indicate an angle between the neutral position and the pivot limit position.

The razor handle 10 is pivotable between the neutral position and the pivot limit position with respect to the razor cartridge 20, and the pivotable range may be determined by an angle a1 (see FIG. 6) between the first stopper 112 and the second stopper 113. The pivot angle a2 of the razor handle 10 may be equal to the angle a1 between the first stopper 112 and the second stopper 113.

The pivot limit position may be a position at which the razor handle 10 is maximally pivoted due to an external force, overcoming the elasticity of the resilience-providing portion 120. In addition, as shown in FIG. 12, in the pivot limit position, the second stopper 113 may come into contact with the blade housing 210. Similarly, in the pivot limit position, the separation preventing flange 111 may be restricted in movement between the hook support **223*b* and the arc-shaped support 221**.

Figure 13:
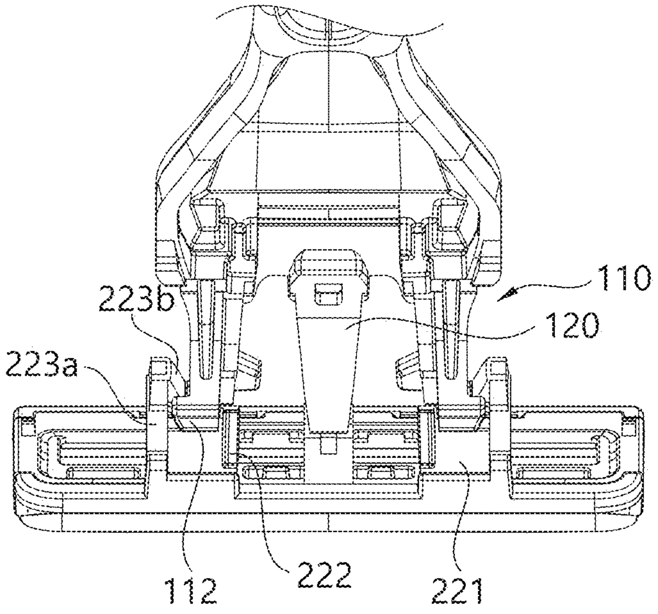
FIG. 13 is a view showing a coupled state of a razor handle and a razor cartridge at a pivot limit position, as seen at an angle different from that of FIG. 12.

Referring to FIG. 13, in the pivot limit position, the first stopper 112 may be in contact with the hook support part **223*b*, thereby preventing upward pivoting. In addition, the first stopper 112 and/or the separation preventing flange 111 may be positioned between the side wall 223*a* and the separation preventing protrusion 222**, thereby restricting lateral movement.

Referring to FIGS. 9 to 13, the connecting arm 110 slides along a convex surface (rear surface) of the arc-shaped support 221 and may be able to move between the neutral position and the pivot limit position. In this case, while the connecting arm 110 slides between the neutral position and the pivot limit position, the separation preventing protrusion 222 may be accommodated in the first accommodating groove 115 unless there is a special circumstance.

In order to prevent the inner wall of the first accommodating groove 115 from interfering with the movement of the separation preventing protrusion 222, the inner space of the first accommodating groove 115 may be formed of a size to accommodate a movement path of the separation preventing protrusion 222 that moves between the neutral position and the pivot limit position.

Hereinafter, with reference to FIGS. 14 and 15, a coupled position (or separated position) of the razor handle 10 will be described.

Figure 14:
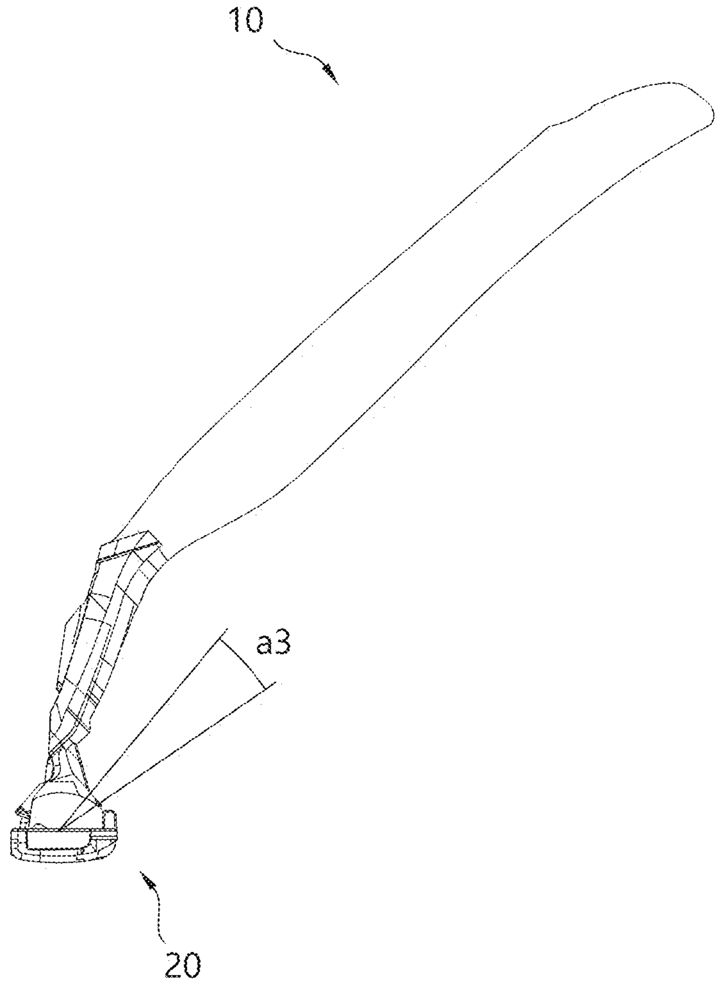
FIG. 14 is a view showing a state in which a razor handle is at a coupled position so as to be coupled to a razor cartridge according to an embodiment of the present disclosure.

FIG. 14 is a view showing a state in which the razor handle 20 according to an embodiment of the present disclosure is in a coupled position with respect to the razor cartridge 10. FIG. 15 is a view showing a coupled state of the razor handle 20 and the razor cartridge 10 in the coupled position.

In the coupled position, the razor handle 10 may form an angle a3 relative to the razor cartridge 20. An angle a3 between the razor handle 10 and the razor cartridge 20 in the coupled position may be smaller than the angle a2 in the pivot limit position. For example, the angle a3 between the razor handle 10 and the razor cartridge 20 in the coupled position may be approximately 15 degrees.

Figure 15:
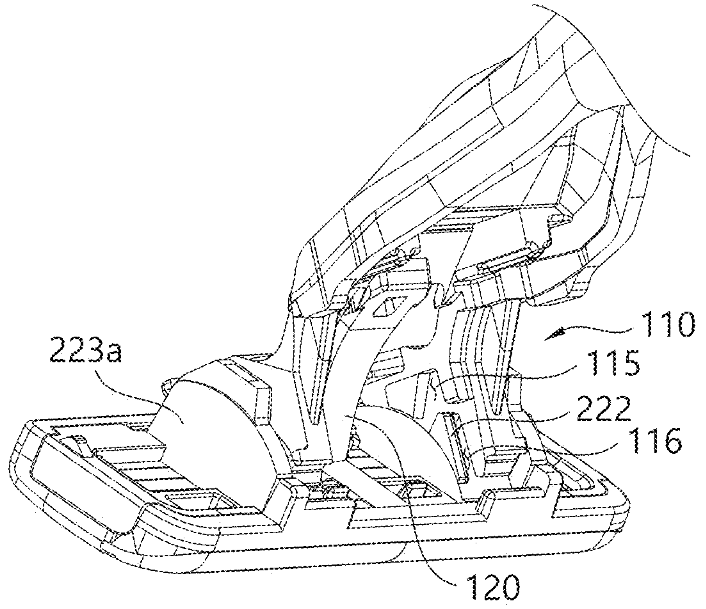
FIG. 15 is a view showing a coupled state of a razor handle and a razor cartridge at a coupled position.

Referring to FIG. 15, the separation preventing protrusion 222 and the second accommodating groove 116 may be positioned aligned with each other in the coupled position. In other words, the separation preventing protrusion 222 and the second accommodating groove 116 may be located on a straight line in the coupled position.

Therefore, in this case, when a user applies an external force to bring the connecting arms 110 closer to each other, the separation preventing protrusion 222 may be accommodated in the second accommodating groove 116 and the razor handle 10 may be separated from the razor cartridge 20.

When assembling the razor handle 10 and the razor cartridge 20, the user places the razor handle 10 in the coupled position while applying an external force to the connecting arm 110, so that the razor handle 10 and the razor cartridge 20 can be coupled.

However, in the above description, it has been described that the coupled position is between the neutral position and the pivot limit position, but the present disclosure is not limited thereto. In another example, the razor handle 10 may be able to be separated or coupled in the pivot limit position.

Hereinafter, with reference to FIGS. 16 to 18, a pivoting operation of the razor handle 10 and a separating and coupling method thereof will be further described.

Figure 16:
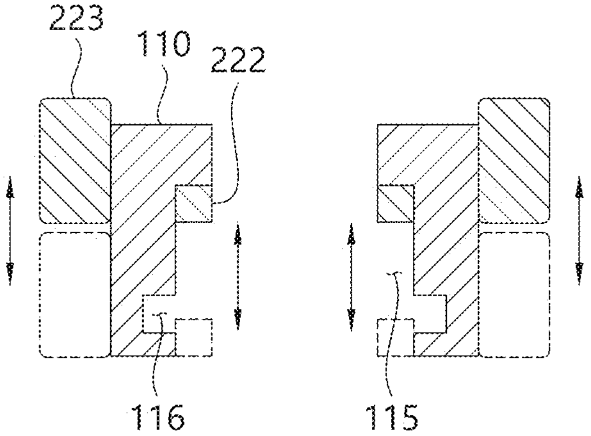
FIG. 16 is a view conceptually showing the relative movement of a separation preventing protrusion when a razor handle pivots in a state in which the razor handle and a razor cartridge are coupled according to an embodiment of the present disclosure.

FIG. 16 is a view conceptually showing the relative movement of the separation preventing protrusion 222 when the razor handle 10 pivots in a state where the razor handle 10 and the razor cartridge 20 are coupled together according to an embodiment of the present invention.

In FIG. 16, the separation preventing protrusion 222 is shown as being moved, but this movement is a relative movement relative to the connecting arm 110. Thus, in practice, the razor cartridge 20 may be fixed and the razor handle 10 may be pivotable, or the razor handle 10 may be fixed and the razor cartridge 20 may be pivotable, or both of the razor cartridge 20 and the razor handle 10 may be pivotable relative to each other.

When the razor handle 10 is in the neutral position, the separation preventing protrusion 222 may be located at a highest point (which is the position indicated by a solid line) based on FIG. 16. On the other hand, when the razor handle 10 is in the pivot limit position, the separation preventing protrusion 222 may be located at a lowest point (which is a position indicated by a dotted line) based on FIG. 16.

As shown in FIG. 16, while the connecting arm 110 slides between the neutral position and the pivot limit position, the separation preventing protrusion 222 may reciprocate within the first accommodating groove 115.

Therefore, except for a case where the separation preventing protrusion 222 is positioned side by side with the second accommodating groove 116, one side of the connecting arm 110 may be supported by the lateral support part 223 and the other side thereof may be supported by the separation preventing protrusion 222. Due to this support, it is possible to effectively prevent separation of the razor cartridge 20 and the razor handle 10 even if a slight external force is applied to the connecting arm 110.

Figure 17:
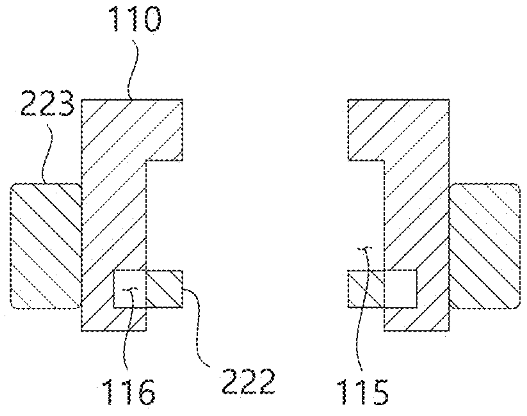
FIG. 17 is a view conceptually showing the positional relationship between a separation preventing protrusion and a second accommodating groove when a razor handle is at a coupled position according to an embodiment of the present disclosure.
Figure 18:
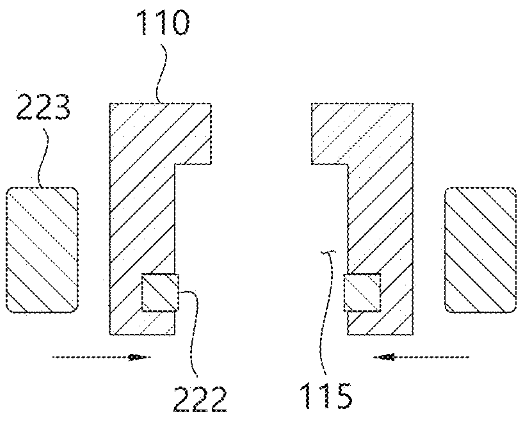
FIG. 18 is a view conceptually showing that a distance between a pair of connecting arms is reduced by an external force according to an embodiment of the present disclosure.

Referring to FIGS. 17 and 18, FIG. 17 is a view conceptually showing the positional relationship between the separation preventing protrusion 222 and the second accommodating groove 116 in a state in which the razor handle 20 is in the coupled position according to an embodiment of the present disclosure. FIG. 18 is a view conceptually showing a case where a distance between a pair of connecting arms 110 according to an embodiment of the present disclosure is reduced by an external force.

As shown in FIG. 17, when the razor handle 20 is in the coupled position, the second accommodating groove 116 and the separation preventing protrusion 222 may be positioned aligned with each other. In this case, the shape and size of the second accommodating groove 116 correspond to the shape and size of the separation preventing protrusion 222, so the second accommodating groove 116 and the separation preventing protrusion 222 may be positioned not to be aligned or positioned to be misaligned each other in a situation other than FIG. 17.

Therefore, in the razor assembly according to an embodiment of the present disclosure, it may be easy to couple and separate the razor handle 10 and the razor cartridge 20 only when the razor handle 10 has a specific angle relative to the razor cartridge 20. That is, since the coupling and separation of the razor handle 10 and the razor cartridge 20 are easy only in a certain state, the coupling and separation may be difficult in other states.

After positioning the separation preventing protrusion 222 as shown in FIG. 17, a user may change the razor handle 10 to the state shown in FIG. 18 by applying an external force from the outside to the inside of each connecting arm 110. In this state, the separation preventing protrusion 222 may be accommodated into the second accommodating groove 116, and the connecting arm 110 may be separated from the razor cartridge 20. The coupling of the razor handle 10 and the razor cartridge 20 is performed in the reverse order of FIGS. 17 and 18, so a description thereof will be omitted.

Hereinafter, with reference to FIGS. 19 and 20, how to guide the separation preventing protrusion 222 to be coupled in right place will be described.

Figure 19:
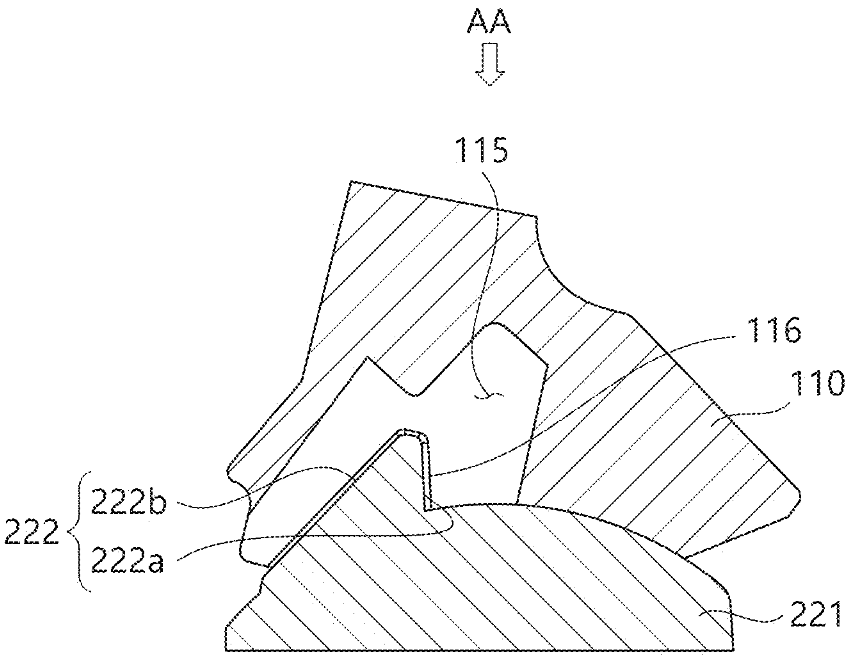
FIG. 19 is a view showing a case where a razor cartridge is coupled to a connecting arm in a correct direction according to an embodiment of the present disclosure.

FIG. 19 is a view showing a state when the razor cartridge 10 is coupled to the connecting arm 110 in a correct direction according to an embodiment of the present disclosure. FIG. 20 is a view showing a case where the razor cartridge 10 is positioned in the reverse direction to the connecting arm 110 according to an embodiment of the present disclosure.

Figure 20:
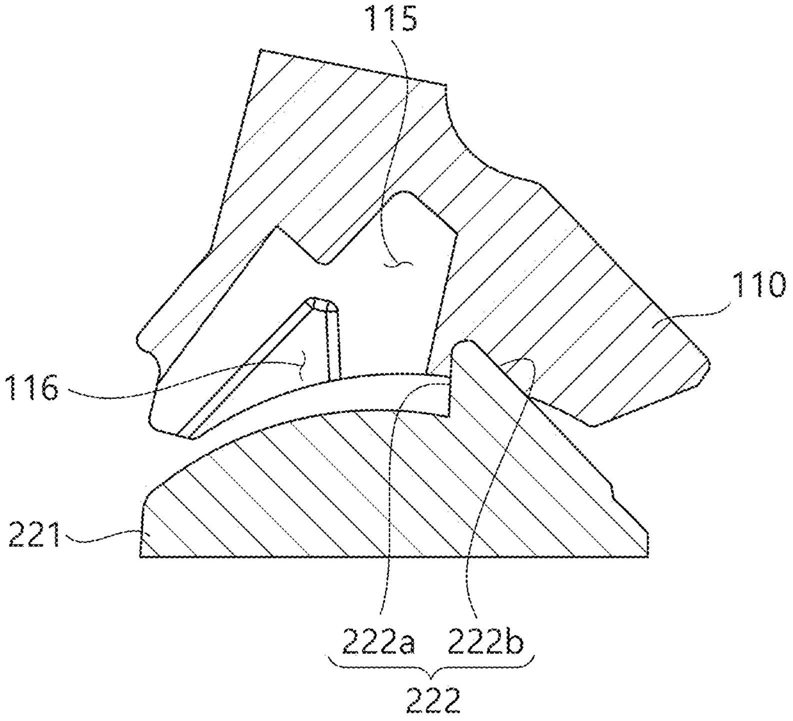
FIG. 20 is a view showing a case where a razor cartridge is positioned in a reverse direction on a connecting arm according to an embodiment of the present disclosure.

As shown in FIGS. 19 to 20, the separation preventing protrusion 222 may protrude at a position eccentric to one side from the center of the arc-shaped support 221 and may have an asymmetrical shape. More specifically, the separation preventing protrusion 222 may include a first inclined surface **222*a* and a second inclined surface 222*b***.

The first inclined surface **222*a* may protrude and extend from the arc-shaped support 221, and may be a surface having a predetermined angle relative to the arc-shaped support 221. For example, the first inclined surface 222*a*** may have an angle substantially parallel to a coupling direction AA.

Here, the coupling direction AA may refer to a direction in which the razor handle 10 is coupled to the razor cartridge 20. For example, an angle between the coupling direction AA and the razor cartridge 20 may be equal to an angle of the razor handle 10 relative to the razor cartridge 20 in the engagement position.

Due to this shape of the first inclined surface **222*a*, when the user presses the connecting arm 110 in the coupled position in the coupling direction AA, an inner wall of the second accommodating groove 116 may be guided along the first inclined surface 222*a* and an end portion of the connecting arm 110 may be accommodated inside the handle coupling part 220**.

Meanwhile, the second inclined surface **222*b* may protrude and extend from the arc-shaped support part 221, and may have a slope that approaches the first inclined surface 222*a*. Since the second inclined surface 222*b* is inclined in a direction toward the first inclined surface 222*a*, a width of the separation preventing protrusion 222 may gradually become narrower along a protruding direction. That is, the separation preventing protrusion 222** may have a pointed shape in which a width decreases toward a free end.

In addition, a length of the second inclined surface **222*b* may be longer than that of the first inclined surface 222*a*. Due to the difference in length and gradient between the first inclined surface 222*a* and the second inclined surface 222*b*, the separation preventing protrusion 222 may, when viewed from the side, have a shape similar to a right-angled triangle with a height defined by the first inclined surface 222*a* and a hypotenuse defined by the second inclined surface 222*b***.

Due to this shape of the second inclined surface **222*b*, even if the user presses the razor handle 10 along the coupling direction AA at a position slightly displaced from the coupled position, the inner wall of the second accommodating groove 116 may come into contact with the inclined surface 222*b* and be then guided and moved by the second inclined surface 222***b*. Therefore, even in this case, correct coupling between the razor handle 10 and the handle coupler 220 may be guided.

In this case, the effect of the coupling guide by the second inclined surface 222*b* may be further maximized as the length of the second inclined surface 222*b* is longer. However, when the length of the second inclined surface 222*b* is excessively long, it may easily lead to unintentional separation. Accordingly, the length of the second inclined surface 222*b* may be set to an appropriate length so that the coupling is not allowed in most positions other than when the razor handle 10 is only slightly displaced from the coupled position.

Meanwhile, since the inner space of the second accommodating groove 116 has a shape corresponding to that of the separation preventing protrusion 222, the guide effect by the first inclined surface 222*a* and the second inclined surface 222*b* may be further maximized.

In addition, since the shape of the second accommodating groove 116 corresponds to the shape of the separation preventing protrusion 222, the coupled connecting arm 110 may be always misaligned with the separation preventing protrusion 222 and the second accommodating groove 116 in any position other than the coupled position. This misalignment prevents the separation preventing protrusion 222 from being accommodated into the second accommodating groove 116 even when an external force is applied, thereby preventing separation of the connecting arm 110.

In addition, the separation preventing protrusion 222 is eccentrically positioned from a most protruding point of the arc-shaped support 221, so when the razor cartridge 20 is positioned in the reverse direction, the separation preventing protrusion 222 may be positioned at the front (in a downward direction in FIG. 20) of the body of the first accommodating groove 115 and/or the connecting arm 110.

Therefore, even if the user presses the connecting arm 110 to couple the connecting arm 110 to the razor cartridge 20, the separation preventing protrusion 222 and the body of the connecting arm 110 come into contact, and unless an excessive external force is applied forcibly, coupling of the razor handle 10 and the razor cartridge 20 may be prevented.

In addition, even if the user places the razor cartridge 20 in the reverse direction and then places the second accommodating groove 116 behind the separation preventing protrusion 222 and presses the razor cartridge 20 in the coupling direction AA, the separation preventing protrusion 222 may collide with the body of the connecting arm 110. This is because the separation preventing protrusion 222 and the second accommodation groove 116 have an asymmetrical shape, so when the separation preventing protrusion 222 and the second accommodation groove 116 are coupled in the reverse direction, the separation preventing protrusion 222 cannot be completely accommodated in the second accommodating groove 116.

In the above description, it has been described that the arc-shaped support part 221 has a convex curved surface and the connecting arm 110 has a concave shape, but the present disclosure is not limited thereto. For example, in some implementations, the arc-shaped support 221 may have a concave curved surface and the connecting arm 110 may have a convex shape.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. The scope of the present disclosure is defined not by the detailed description but by the appended claims, and all modifications and alterations derived from the concept, the range, and the equivalents of the claims will be construed as being included in the scope of the present disclosure.

What is claimed is:

1. A razor assembly comprising:

a razor cartridge including at least one razor blade; and a razor handle pivotably coupled to the razor cartridge, wherein the razor cartridge comprises:

a blade housing accommodating the razor blade, the blade housing comprises a first side and a second side opposite to the first side; and a handle coupling part provided on the second side of the blade housing and pivotably coupled to the razor handle, wherein the handle coupling part comprises a separation preventing protrusion protruding to prevent the razor handle from being separated from the handle coupling part, wherein the razor handle includes a connecting arm configured to move along one surface of the handle coupling part, wherein the connecting arm is configured to position the separation preventing protrusion inside of an inner wall of the connecting arm in response to the connecting arm moving along the one surface of the handle coupling part, wherein the connecting arm includes an accommodating groove recessed from the inner wall to receive the separation preventing protrusion in response to the connecting arm being coupled to the handle coupling part, wherein the handle coupling part further comprises a lateral support part that is spaced apart from the separation preventing protrusion and protrudes from the second side of the blade housing, and wherein the connecting arm is positioned between the lateral support part and the separation preventing protrusion.

2. The razor assembly of claim 1, wherein:

the razor handle is pivotably coupled to the razor cartridge between a neutral position and a pivot limit position, and in response to the razor handle being in the neutral position, at least a portion of the separation preventing protrusion is positioned not to be aligned with the accommodating groove.

3. The razor assembly of claim 1, wherein:

the razor handle is pivotably coupled to the razor cartridge between a neutral position and a pivot limit position, and in response to the razor handle being in the pivot limit position or between the neutral position and the pivot limit position, the separation preventing protrusion and the accommodating groove are aligned with each other.

4. The razor assembly of claim 1, wherein the connecting arm is configured to move along the one surface of the handle coupling part in a state where a first side of the connecting arm is supported by the separation preventing protrusion and a second side of the connecting arm is supported by the lateral support part.

5. The razor assembly of claim 1, wherein the lateral support part further comprises a hook support part configured to support the connecting arm toward the first side of the blade housing so that the connecting arm is prevented from being separated rearward of the razor cartridge.

6. The razor assembly of claim 1, wherein:

the separation preventing protrusion is disposed eccentrically from a central portion of the razor cartridge and the accommodating groove is disposed eccentrically from a central portion of the connecting arm so as to prevent the razor cartridge from being reversely coupled to the razor handle.

7. The razor assembly of claim 1, wherein the accommodating groove is formed at a periphery of the inner wall of the connecting arm.

8. The razor assembly of claim 1, wherein the separation preventing protrusion has an asymmetrical shape with respect to a direction in which the razor handle is coupled to the razor cartridge so as to prevent the razor cartridge from being reversely coupled to the razor handle.

9. The razor assembly of claim 1, wherein the separation preventing protrusion comprises:

a first inclined surface protruding from a first location of the handle coupling part and having a predetermined angle relative to the first location of the handle coupling part; and a second inclined surface protruding from a second location of the handle coupling part and inclined in a direction toward the first inclined surface.

10. The razor assembly of claim 9, wherein a length of the second inclined surface is longer than a length of the first inclined surface.

11. The razor assembly of claim 1, wherein the accommodating groove is recessed from the inner wall of the connecting arm, so that a space accommodating the separation preventing protrusion has a shape corresponding to a shape of the separation preventing protrusion.

12. The razor assembly of claim 1, wherein the razor handle further comprises:

a return force providing unit comprising an elastic material to elastically support the blade housing in a state in which the razor handle is coupled to the handle coupling part.

13. A razor assembly comprising:

a razor cartridge including at least one razor blade; and a razor handle pivotably coupled to the razor cartridge, wherein the razor cartridge comprises:

a blade housing accommodating the razor blade; and a handle coupling part provided on one side of the blade housing and pivotably coupled to the razor handle, wherein the handle coupling part comprises a separation preventing protrusion protruding to prevent the razor handle from being separated from the handle coupling part, wherein the razor handle includes a connecting arm configured to move along one surface of the handle coupling part, wherein the connecting arm is configured to position the separation preventing protrusion inside of an inner wall of the connecting arm in response to the connecting arm moving along the one surface of the handle coupling part, wherein the connecting arm includes an accommodating groove recessed from the inner wall to receive the separation preventing protrusion in response to the connecting arm being coupled to the handle coupling part, wherein the handle coupling part further comprises an arc-shaped support configured to guide a pivoting motion of the razor handle, the arc-shaped support comprises the one surface, and wherein the connecting arm is configured to slide along the one surface of the arc-shaped support.

14. The razor assembly of claim 13, wherein:

the separation preventing protrusion protrudes from the arc-shaped support, and the inner wall of the connecting arm is configured to accommodate the separation preventing protrusion in response to the connecting arm sliding along the one surface of the arc-shaped support.

15. The razor assembly of claim 13, wherein the separation preventing protrusion is spaced apart from a most protruding point of the arc-shaped support.

16. A razor assembly comprising:

a razor cartridge including at least one razor blade; and a razor handle pivotably coupled to the razor cartridge, wherein the razor cartridge comprises:

a blade housing accommodating the razor blade; and a handle coupling part provided on one side of the blade housing and pivotably coupled to the razor handle, wherein the handle coupling part comprises a separation preventing protrusion protruding to prevent the razor handle from being separated from the handle coupling part, wherein the razor handle includes a connecting arm configured to move along one surface of the handle coupling part, wherein the connecting arm is configured to position the separation preventing protrusion inside of an inner wall of the connecting arm in response to the connecting arm moving along the one surface of the handle coupling part, wherein the connecting arm includes an accommodating groove recessed from the inner wall to receive the separation preventing protrusion in response to the connecting arm being coupled to the handle coupling part, wherein the separation preventing protrusion comprises:

a first inclined surface protruding from a first location of the handle coupling part and having a predetermined angle relative to the first location of the handle coupling part; and a second inclined surface protruding from a second location of the handle coupling part and inclined in a direction toward the first inclined surface, and wherein a width between the first inclined surface and the second inclined surface decreases as it goes in a protruding direction of the separation preventing protrusion.

* * * * *